(12) United States Patent
Salis

(10) Patent No.: US 7,128,312 B2
(45) Date of Patent: Oct. 31, 2006

(54) ELASTOMERIC SPRING ASSEMBLY FOR A RAILCAR AND METHOD OF MAKING SAME

(75) Inventor: Keith A. Salis, Clare, IL (US)

(73) Assignee: Miner Enterprises, Inc., Geneva, IL (US)

( * ) Notice: Subject to any disclaimer, the term of this patent is extended or adjusted under 35 U.S.C. 154(b) by 172 days.

(21) Appl. No.: 10/952,470

(22) Filed: Sep. 28, 2004

(65) Prior Publication Data

US 2005/0046096 A1    Mar. 3, 2005

Related U.S. Application Data

(62) Division of application No. 10/348,565, filed on Jan. 21, 2003.

(51) Int. Cl.
*F16F 1/36* (2006.01)

(52) U.S. Cl. .............. 267/141.1; 267/33; 267/140.4; 267/294; 267/153

(58) Field of Classification Search ............... 267/257, 267/258, 33, 153, 141.1–141.7, 141, 294, 267/140.4
See application file for complete search history.

(56) References Cited

U.S. PATENT DOCUMENTS

| | | | |
|---|---|---|---|
| 2,605,099 A | 7/1952 | Brown | |
| 3,178,036 A | 4/1965 | Cardwell | |
| 3,416,783 A * | 12/1968 | Tondato | ..................... 267/33 |
| 3,556,503 A | 1/1971 | van Moss | |
| 3,670,661 A | 6/1972 | Pangailla | |
| 3,735,711 A | 5/1973 | Hassenauer | |
| 3,795,390 A | 3/1974 | Kendall et al. | |
| 3,910,655 A | 10/1975 | Wilson et al. | |
| 3,931,005 A | 1/1976 | Gasser | |
| 3,957,318 A | 5/1976 | Wiebe | |
| 4,355,583 A | 10/1982 | Eggert, Jr. | |
| 4,567,833 A | 2/1986 | Hanson | |
| 4,793,597 A | 12/1988 | Smith | |
| 4,817,921 A | 4/1989 | Stevenson | |
| 4,874,154 A * | 10/1989 | Zimbone | ................. 264/140.4 |
| 4,957,277 A | 9/1990 | Paton | |
| 4,998,997 A | 3/1991 | Carlson | |
| RE33,696 E * | 9/1991 | Stevenson | ..................... 267/33 |
| 5,351,844 A | 10/1994 | Carlstedt | |
| 5,364,086 A | 11/1994 | Paton | |
| 5,386,783 A | 2/1995 | Rhen et al. | |
| 5,601,031 A | 2/1997 | Carlson | |
| 6,092,470 A | 7/2000 | O'Donnell | |
| 6,250,617 B1 | 6/2001 | Tews | |
| 6,341,422 B1 | 1/2002 | O'Donnell | |

* cited by examiner

*Primary Examiner*—Matthew C. Graham
(74) *Attorney, Agent, or Firm*—John W. Harbst

(57) ABSTRACT

An elastomeric spring assembly for a railcar apparatus is disclosed. The elastomeric spring assembly includes an elongated body of elastomeric material having a series of axially spaced members coaxially arranged and wholly embedded within the body of elastomeric material. The majority of the embedded members are configured to resist radial outward movement of said elastomeric material while causing the elastomeric material to react in an axial direction between confronting surfaces defined by the members upon axial deflection of the elastomeric spring whereby enhancing performance characteristics of the spring assembly. A method of making an elastomeric spring assembly is also disclosed.

16 Claims, 3 Drawing Sheets

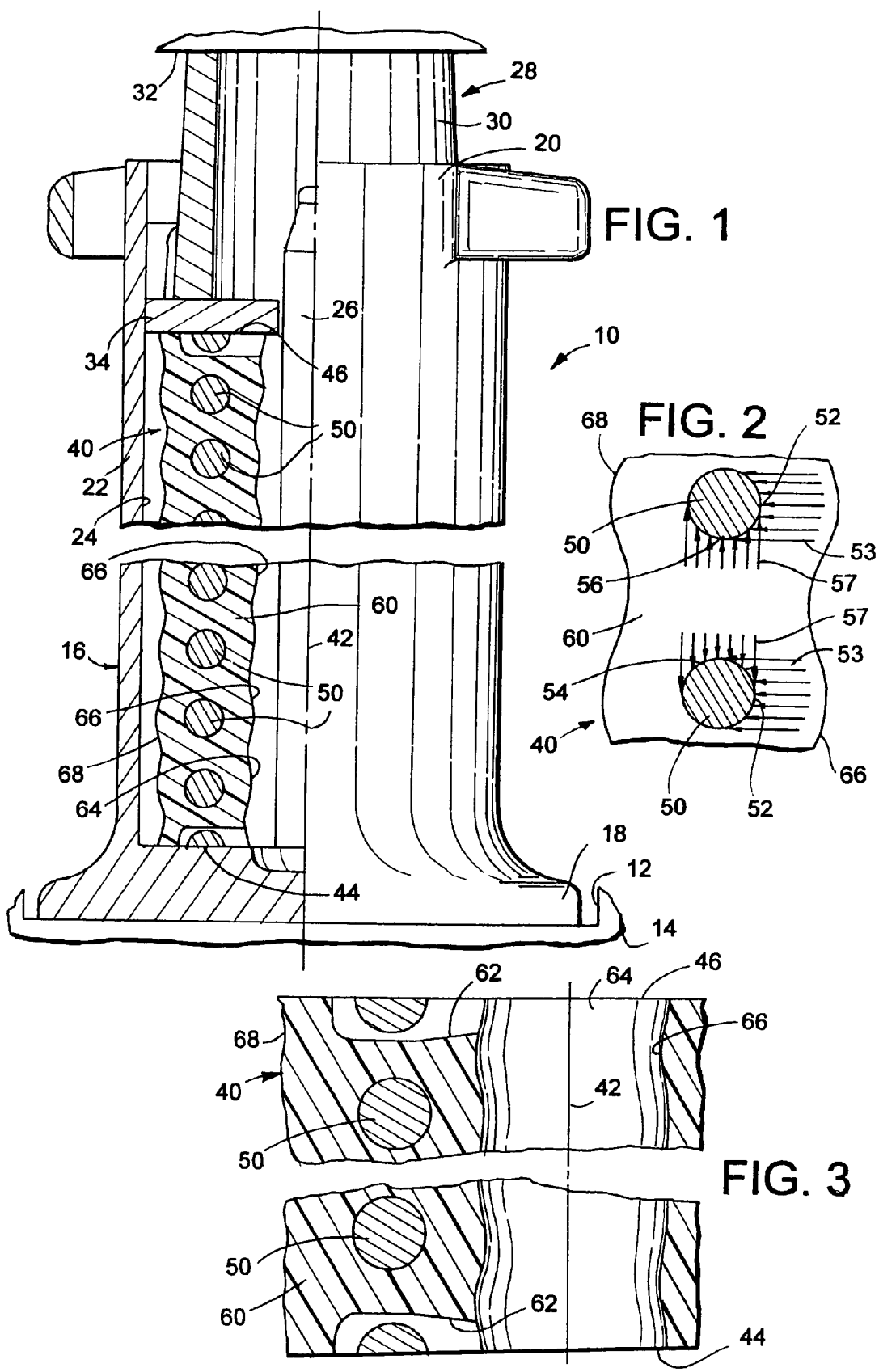

ELASTOMERIC SPRING ASSEMBLY FOR A RAILCAR AND METHOD OF MAKING SAME

This application is a division of coassigned patent application Ser. No. 10/348,565 filed Jan. 21, 2003, now U.S. Pat. No. 6,877,623 granted Apr. 12, 2005.

FIELD OF THE INVENTION

The present invention generally relates to an elastomeric spring assembly for a railcar and, more particularly, to a spring assembly including an elongated body of elastomer material having a series of axially spaced members wholly embedded and coaxially arranged therewithin, with each member being configured to resist radial outward movement of the elastomer while causing the elastomer to react between axially confronting surfaces of the members upon axial deflection of the spring assembly whereby enhancing spring assembly performance.

BACKGROUND OF THE INVENTION

An energy absorption apparatus or spring is known to be used on a railcar in various applications and between two masses. For example, a spring is commonly used and forms an integral part of a railroad car side bearing. A railroad car side bearing is typically disposed to opposite lateral sides of a car body between a centerpiece or bolster of a wheeled truck and an underside of a railroad car body. During movement of the railcar, the spring of each side bearing acts as an energy absorption apparatus which serves to control or restrict "hunting" and limit "rolling" movements of the railcar about a longitudinal axis.

Alternatively, an energy absorption or spring is frequently used as part of a railcar buffer assembly, railcar drawbar assembly or railcar draft gear assembly. Each of these railcar devices typically includes one or more springs for absorbing, dissipating and returning energy between adjacent ends of two railcars. As will be appreciated, an increased ability to control impacts between adjacent railcars tends to increase performance characteristics of the railcar components as well as add protection to the lading carried and shipped within the railcar.

Significantly large amounts of energy and excessive resultant dynamic impacts are developed between multiple railcars during the make-up and operation of a 100 railcar or train consist. It is well known, the spring assemblies utilized in railcar draft gears are sometimes required to operate under energy impact loads measuring well in excess of 800,000 pounds. Accordingly, the materials forming the spring assemblies must have great strength or they will readily fail under the substantial loads, and energy impacts repeatedly imparted thereto during daily operation of the railcars and under adverse temperature conditions.

It is known to equip a railroad car draft gear with compressive resilient members such as spring loaded steel elements or a series of elastomeric pads arranged in stacked relationship relative to each other. In one form, a railcar spring assembly is formed from an elongated coil spring having a cylindrically shaped column of rubber-like material extending through the central core of the steel spring. As such, the steel spring offers a first independent spring rate while the rubber-like material offers a second independent spring rate. The spring loaded steel springs, utilizing a steel on steel friction interface, however, proved ineffective in some applications because of seizing and galling problems. Those spring assemblies having a column of rubber-like material with a coil spring wound thereabout have also proven unsatisfactory since the rubber-like material, when compressed under extremely heavy loads, tends to plasticize and squeeze out between the spring coils, thus, creating other serious drawbacks and related problems. Moreover, such spring assemblies have not yielded satisfactory spring rates.

There is a continuing desire to increase the carrying capacity of railcars. Of course, increasing the capacity of railcars tends to add to the dynamic loads placed upon the draft gears and other railcar suspension components. The size constraints of the housing wherein the spring assemblies are mounted, however, limit both the number and size of elastomeric pads which can be stacked therewithin. Since such springs are limited in size they are frequently subjected to increased wear due to increases in load carrying capacities of the railcars and result in a greater need for maintenance along with higher replacement needs whereby adding to the overall cost of rail transportation. Additionally, any new spring assembly must be capable of acting and serving as a replacement for an existing spring and, thus, must be sized to fit within existing housings.

Thus, there is a continuing need and desire for a simple but strong, reliable and yet inexpensive spring assembly for a railcar which embodies the strength of steel and the numerous known benefits associated with elastomeric springs without any significant change in size.

SUMMARY OF THE INVENTION

In view of the above, and in accordance with one aspect, there is provided an elastomeric spring assembly for a railcar. In one form, the elastomeric spring assembly includes an elongated body of elastomeric material having a series of axially spaced members coaxially arranged and wholly embedded within the body of elastomeric material. The majority of the embedded members are configured to resist radial outward movement of said elastomeric material while causing the elastomeric material to react in an axial direction between confronting surfaces defined by the members upon axial deflection of the elastomeric spring whereby enhancing performance characteristics of the spring assembly.

According to a second aspect, there is provided a railcar apparatus for absorbing, dissipating and returning energy imparted thereto. The railcar apparatus includes a housing and an elastomeric spring assembly adapted to be mounted within a cavity or chamber defined by the housing. The elastomeric spring assembly has an elastomeric body defining an elongated axis along with an inner closed marginal edge and an outer marginal edge. The elastomeric body has axially spaced first and second ends and a series of axially spaced members arranged generally coaxial relative to said elongated elastomeric body. In a preferred form, the majority of such members are wholly embedded within and between the inner closed marginal edge and the outer marginal edge of the elastomeric body. Moreover, such members are configured to resist radial outward movement of the elastomeric body while causing elastomer between confronting surfaces of the members to react in an axial direction upon axial deflection of the spring assembly whereby significantly increasing the spring assembly performance including energy absorption capabilities without increasing the size of the outer marginal edge of the elastomeric body.

With either aspect, it has been found beneficial to form the elastomeric body of the spring assembly from an elastomer having a plastic to elastic strain ratio greater than 1.5 to 1. Moreover, and with either aspect of the invention, the series of members embedded within the elongated body preferably comprise helical convolutions of a coil spring. For reasons appreciated by those skilled in the art, opposed ends of the spring are preferably arranged with respect to the direction of force or impact to be applied to the spring assembly.

In a most preferred form, the housing is formed with a guide which is accommodated within a central bore or recess opening to at least one end of the spring assembly. As such, and upon joinder of the spring assembly to the housing, the spring assembly is positively positioned relative to the housing during operation of the railcar.

According to another aspect, an elastomeric spring assembly is provided for a railroad car apparatus. The elastomeric spring assembly includes an elongated tubular member formed from an elastomer and a coil spring arranged generally coaxial relative to and extending substantially the length of the tubular member. In this form, the tubular member has an inner closed marginal edge and an outer marginal edge along with axially spaced first and second ends. The coil spring includes helical convolutions wholly embedded in the elastomer between the inner closed marginal edge and the outer marginal edge of the tubular member. An inner radial surface of the majority of the helical convolutions restricts radial outward movements of the elastomer encompassed thereby while confronting axially spaced surfaces on the helical convolutions allow the elastomer to react in an axial direction whereby enhancing the spring assembly performance including energy absorption capabilities without increasing the cross-sectional size of the tubular member.

According to this aspect, the tubular member is formed from an elastomer selected from a class of elastomers wherein the plastic to elastic strain ratio is greater than 1.5 to 1. Additionally, and according to this aspect, the axial distance between opposed ends of the coil spring is substantially equivalent to the axial length of the elastomeric member. Preferably, opposed and radially inner margins of the tubular member are recessed to reduce the radial outwardly directed forces applied to opposed spring ends during axial deflection of the spring assembly.

In accordance with still another aspect, a method of manufacturing an elastomeric spring assembly is disclosed. The method comprises the steps of: encapsulating a series of axially spaced members in an elongated body formed from an elastomeric material such that each member is generally coaxially arranged relative to said elongated body and with the majority of such members being configured to resist radial outward movement of said elastomeric material relative to the axis while causing said elastomeric material to react in an axial direction between confronting surfaces defined by the members upon axial deflection of said elongated body; and, compressing the elongated body having the members wholly embedded therewithin by an amount exceeding 15% of a free height measured between the opposed ends of the elongated body whereby transmuting the elastomeric body and members into an elastomeric spring assembly having an advantageous spring rate.

Preferably, the methodology further includes the step of: providing a central bore in the elastomeric body which opens at opposite ends and such that the elastomeric body has an outer diameter and an inner diameter. In a most preferred embodiment, the members embedded in the elongated body are comprised of helical convolutions of a coil spring. In this embodiment, the method for making the elastomeric spring further involves centralizing the coil spring between the inner and outer diameters of the elastomeric body. A preferred methodology further includes the step of: treating each members exterior such that the elastomer encapsulating such members is inhibited from moving therepast.

Accordingly, it is an object of this invention to provide a railcar spring assembly which is both strong and reliable while remaining economical to manufacture.

Another object of this invention is to provide a railcar spring assembly which embodies the advantages inherent with elastomers, while offering performance characteristics which exceed known elastomeric springs.

Still another object of this invention is to provide a one-piece spring assembly comprised of a combination of materials such that energy absorbing capabilities of the spring assembly can be "controlled" to satisfy particular railcar applications.

These and other objects, aims and advantages will become more apparent from the following description, appended claims and drawings depicting an exemplary embodiment of the invention.

BRIEF DESCRIPTION OF THE DRAWINGS

FIG. 1 is a partial longitudinal sectional view of one form of the present invention in use in combination with a railcar draft gear assembly;

FIG. 2 is an enlarged sectional area of a portion of the spring assembly illustrated in FIG. 1;

FIG. 3 is an enlarged sectional view of opposed ends of one form of spring assembly;

DETAILED DESCRIPTION OF THE INVENTION

Figure 4:
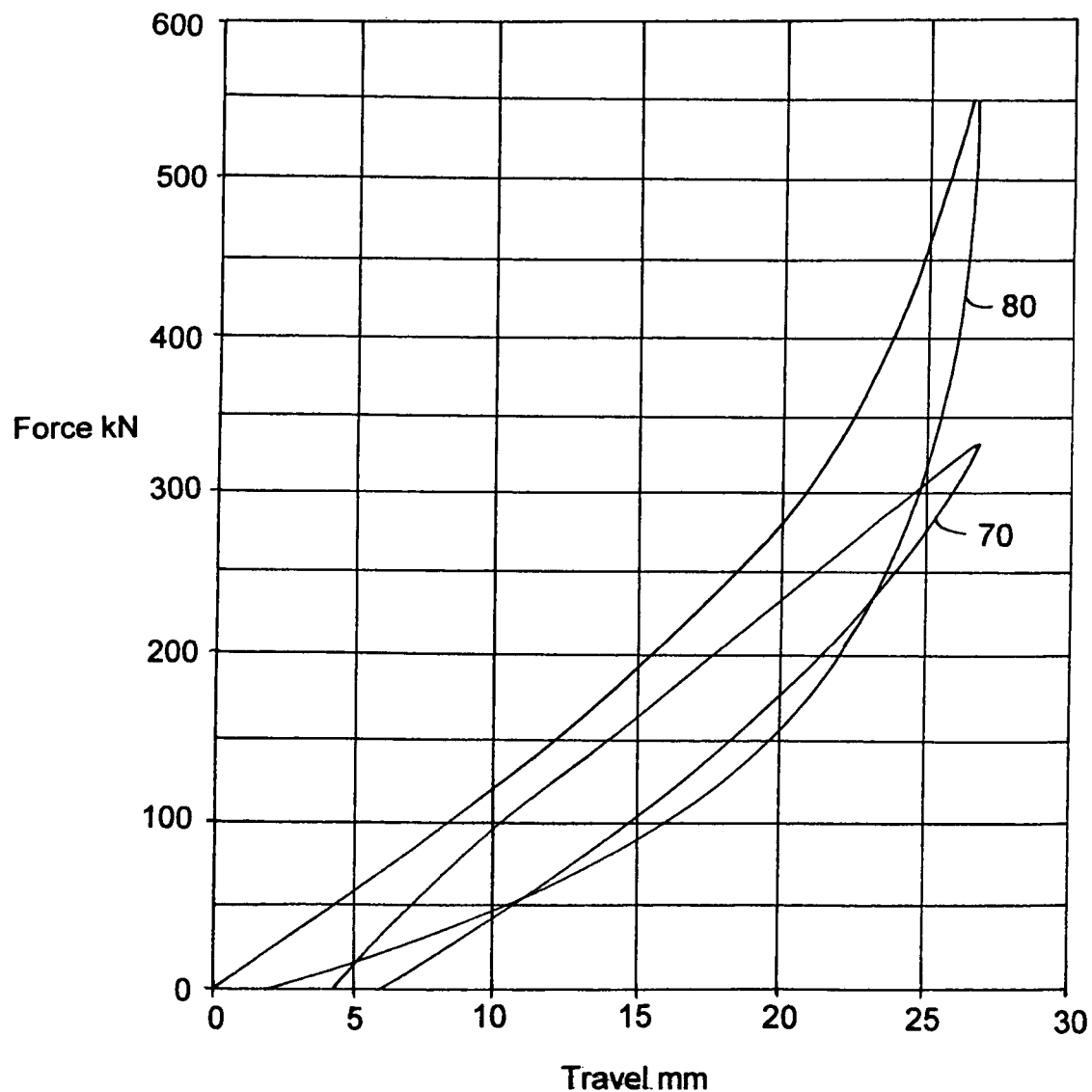
FIG. 4 schematically illustrates and compares a force/deflection curve of a conventional elastomer spring with a force/deflection curve of the spring assembly of the present invention.

While the present invention is susceptible of embodiment in multiple forms, there is shown in the drawings and will hereinafter be described a preferred embodiment of the invention, with the understanding this disclosure is intended to set forth an exemplification of the invention which is not intended to limit the invention to the specific embodiment illustrated and described.

Referring now to the drawings, wherein like reference numerals indicate like parts throughout the several views, there is shown in FIG. 1 a railcar apparatus generally identified by reference numeral 10. As will be appreciated, the railcar apparatus 10 can take a myriad of designs and shapes without detracting or departing from the spirit and scope of the present invention. In the exemplary embodiment, apparatus 10 is shown as a railcar draft gear assembly typically accommodated within a pocket 12 on a conventional railcar, generally identified by numeral 14. It should be appreciated, the teachings and advantages of the present invention can equally apply to other railcar assemblies, i.e., a railcar side bearing, a railcar drawbar assembly, a railcar buffer assembly, or a railcar suspension assembly, without detracting or departing from the spirit and scope of the present invention.

The specific configuration of the draft gear assembly 10 is not an important consideration of the present invention; whereas, the illustrated railcar apparatus 10 is intended only for illustrative purposes. It is sufficient to say, the railcar draft gear apparatus or assembly 10 is designed to absorb, dissipate and return energy forces axially imparted thereto during operation of the railcar 14. The draft gear assembly 10 illustrated in FIG. 1 includes a housing 16, preferably formed from metal, and having a base 18, defining a closed end, and an open end 20, along with wall structure 22 extending between the axially spaced housing ends 18, 20. The draft gear housing 16 can measure between about 14 inches and about 29 inches in length between the ends 18, 20 depending upon the size of railcar opening or pocket 12 accommodating the draft gear assembly 10. In one form, the draft gear housing 16 has a generally tubular or hollow configuration defining a spring chamber 24 extending the majority of its length.

In one form, the draft gear housing 16 furthermore includes an elongated guide 26 extending from base 18 toward the open end 20 of housing 16. Toward the open housing end 20, a plunger mechanism 28 is arranged. In the exemplary embodiment, plunger mechanism 28 includes a plunger 30, whose free end extends axially from and beyond the open housing end 20 for operable engagement with a conventional follower plate 32, and whose other end operably engages with a spring seat 34 arranged in a well known manner within the draft gear housing 16. A spring assembly 40, according to the present invention, is operably positioned between the housing base 18 and the spring seat 34 within chamber 24 for absorbing, dissipating and returning energy forces axially imparted to the draft gear assembly during operation of the railcar 14.

As shown, spring assembly 40 is configured to be accommodated within chamber 24 of the draft gear housing 16 and defines an elongated axis 42 along with opposed, axially spaced ends 44 and 46. As will be appreciated, in one form, spring assembly 40 is formed as one-piece and preferably has a simple elongated cylindrical shape or configuration. Of course, if the cavity or chamber of the railcar apparatus wherein spring assembly 40 is to be accommodated has other than a generally round shape, the spring assembly 40 may also be otherwise configured.

In the illustrated embodiment, the purpose of spring assembly 40 is to urge the spring seat 34 and plunger 30 away from the housing base 18. As such, and during operation of the railcar 14, primarily axial columnar loading is applied to the spring assembly 40. Accordingly, the spring ends 44, 46 are suitably arranged in generally parallel relation relative to each other and generally normal to the columnar load to be applied to the spring assembly 40. If necessary, however, the spring ends 44, 46 can be arranged in generally non-planar relation or otherwise easily designed configurations to accept canted or other angularly directed loading applied to the spring assembly. Generally, the axial length measured between the opposed ends 44, 46 effectively defines the "operable length" of the spring assembly 40.

As shown, spring assembly 40 includes a series of members 50 arranged in axially spaced relation relative to each other and coaxially arranged between the spring assembly ends 44, 46. Preferably, the members 50 are generally equally spaced relative to each other between the opposed ends 44, 46 of the spring assembly 40. The members 50 are preferably of metallic composition, although they could be formed of composite fibers, plastic, or other nonmetallic compositions having suitable structural properties. In the exemplary embodiment, and for simplicity, the axially spaced members 50 comprise helical convolutions of a coil spring. As shown, the spring convolution 50 at each end of the coil spring is preferably configured with a generally flat or planar profile which parallels and is arranged generally coplanar with the corresponding spring assembly ends 44, 46.

An important aspect of the present invention relates to arranging the members 50 in operable relationship with an elastomer body or member 60 such that portions of the elastomeric body 60 wholly encapsulate, extend intermediate and isolate the individual members or convolutions 50 from each other. Notably, and as shown in FIG. 2, the members 50 embedded within and encapsulated by the elastomer body 60 are each configured with a surface 52 to resist radial outward movement of the elastomer material as schematically illustrated by arrows 53 whereby significantly reducing radial bulging of the spring assembly 40. Moreover, and as shown in FIG. 2, the axially spaced members 50 are furthermore configured such that confronting axially spaced surfaces 54, 56 on adjacent but axially spaced members 50 allow the elastomer therebetween to react in an axial direction, as schematically illustrated in FIG. 2 by arrows 57, when axial or columnar loading is applied thereto whereby enhancing the spring assembly performance including increasing energy absorption capabilities without significantly increasing the outer size of the spring assembly 40.

The particular elastomer material employed in the present invention is sold by the DuPont Company under the tradename HYTREL. Ordinarily, however, a HYTREL elastomer has inherent physical properties making it unsuitable for use as a spring. Applicant's assignee, however, has advantageously discovered that after shaping a HYTREL elastomer into the appropriate configuration, it is possible to advantageously impart spring-like characteristics to the elastomer member. Basically, after the elastomeric spring assembly 40 is initially formed, the elastomeric body 60 having the members 50 embedded therewithin is axially compressed sufficiently to orientate molecules extending throughout the elastomeric body 60 in a specific and desired manner. Coassigned U.S. Pat. No. 4,198,037 to D. G. Anderson better describes the above noted polymer material and spring forming process and is herein incorporated by reference to the fullest extent applicable. When used as a spring, the thermoplastic elastomer body or member 60 has a plastic to elastic strain ratio greater than 1.5 to 1.

Turning to FIG. 3, and in the exemplary embodiment, the ends of the coil spring are configured to extend generally parallel to the opposed ends 44, 46 of the spring assembly 40. To accomplish such results, the cross-section of the helical convolution arranged adjacent to the spring assembly ends 44, 46 have been reduced. Testing has revealed, however, when axial columnar loading is applied to the spring assembly 40, the elastomeric material radially confined by the spring ends tends to push the spring ends radially outwardly thereby producing certain problems and drawbacks. As shown in FIG. 3, and to reduce the impact of such radial loading on the free ends of the coil spring, the elastomeric body 60 is preferably configured such that inner margins of the elastomeric body 60 surrounded by the free ends of the coil spring are removed or reduced, as schematically shown by numeral 62, to eliminate the radially directed forces and loading applied to the opposed spring ends during axial deflection of the spring assembly 40.

In a preferred embodiment, and returning to FIG. 1, the elastomeric body 60 having members 50 wholly embedded therewithin preferably defines a central recess 64. In the illustrated embodiment, recess 64 is defined by a substantially constant diameter throughbore which opens to the opposed spring assembly ends 44, 46. As such, the elastomeric body 60 is provided with an inner closed marginal edge 66 and an outer marginal edge 68 defining a substantially constant wall thickness for the elastomeric body 60.

In the illustrated embodiment, the inner closed marginal edge 66 is sized to slidably and axially accommodate the elongated guide 26 whereby the spring assembly 40 is positively positioned relative to and within spring chamber 24 on housing 20. Moreover, in a most preferred form, each member 50 is radially positioned generally midway between the inner closed marginal edge 66 and the outer marginal edge 68 of the elastomeric body 60.

It may not always be necessary to bond members 50 to the surrounding elastomeric body 60 provided the frictional and other mechanical and thermal effects produce satisfactory results. To enhance the frictional effects between members 50 and the elastomeric body 60, however, the outer surface area of each member 50 or helical spring convolution is preferably "shot peened" or otherwise treated. Otherwise, members 50 can be mechanically bonded to the elastomeric body 60 with a suitable adhesive or bonding agent whereby restricting the radial "flow" of elastomer material between the members 50.

Figure 5:
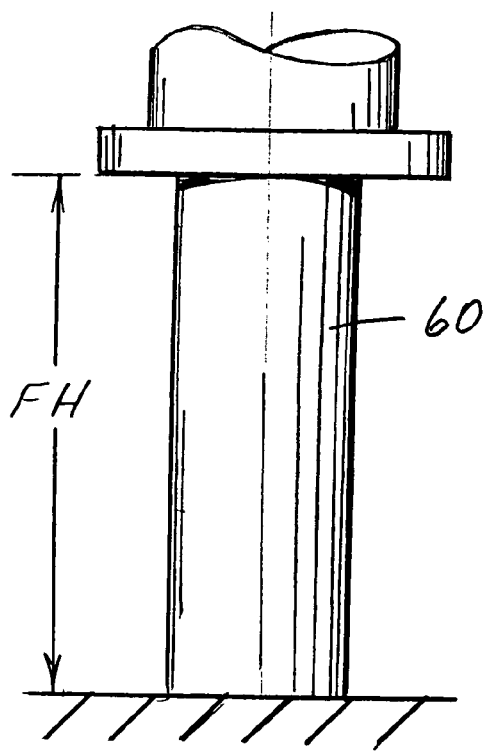
FIG. 5 is a schematic depiction of an elongated elastomer body or preform embodying principals of the present invention prior to compression.
Figure 6:
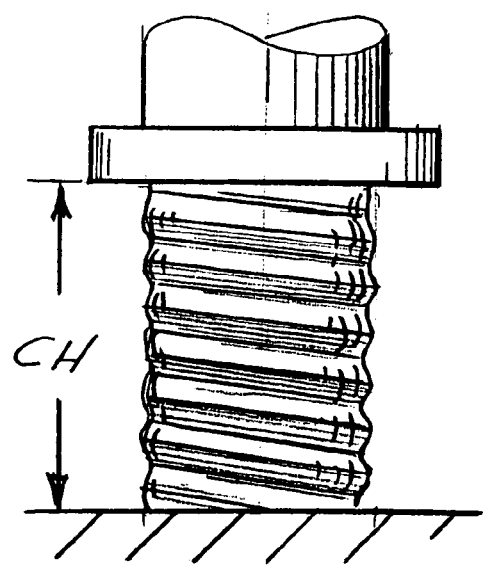
FIG. 6 is a schematic depiction of an elongated elastomer body or preform shown in FIG. 5 compressed to a predetermined height.
Figure 7:
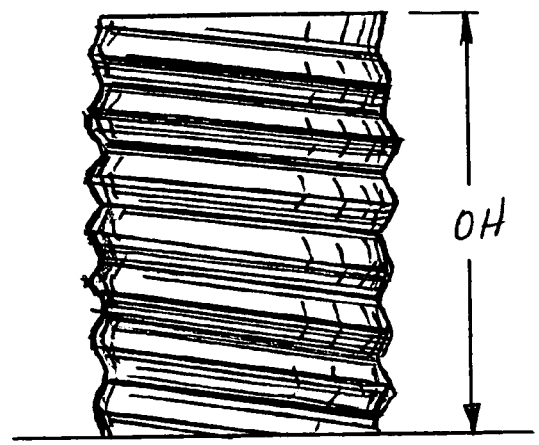
FIG. 7 is a schematic depiction of one form of an elastormeric spring assembly embodying principals of the present invention and shown at an operational height and which results from the preform being compressed as shown in FIG. 6.

Still another aspect of the present invention relates to a methodology or process for making an elastomeric spring assembly for use with a railcar apparatus. The process for making an elastomeric spring assembly 40, as described above, comprises the steps of: encapsulating a series of axially spaced members 50 in an elongated body or preform 60 (FIG. 5) formed from an elastomeric material such that each member 50 is generally coaxially arranged relative to the elongated body 60, with the majority of the members 50 being configured to resist radial outward movement of the elastomeric material relative to an axis 42 of the spring assembly 40 while causing the elastomeric material to react in an axial direction between confronting suffaces 54, 56 defined by the members 50 upon axial deflection of the elongated body 60; and, compressing the elongated body or preform 60 to a compressed height CH (FIG. 6) with the members 50 wholly embedded therewithin by an amount exceeding 15% of a free height FH (FIG. 5) measured between said opposed ends of the elongated body or preform 60 prior to the spring assembly 40 being placed in operative service whereby transmuting the composite assembly into the elastomeric spring assembly 40 having both an advantageous spring rate and size substantially the same as a similarly shaped block of elastomer. As shown in FIG. 7, and following completion of the compressing step, the spring assembly 40 has an operational height OH (FIG. 7) of about 80% of the precompressed or free height FH (FIG. 5) of the elongated body or preform 60 and before being arranged in operable combination with a railcar apparatus.

In one form, the methodology for making the elastomeric spring assembly 40 further includes the step of: providing a central bore 64 in the elastomeric body 60 which opens at opposite ends such that the elastomeric body 60 has an inner diameter 66 and an outer diameter 68. In a most preferred embodiment, the method for making the elastomeric spring assembly 40 further involves radially centralizing members 50 between the inner and outer diameters 66 and 68, respectively, of the elastomeric body 60. A preferred methodology further includes the step of: treating an exterior of the members 50 such that mechanical bonding between the members 50 and the elastomeric body 60 is enhanced.

This invention comes from a unique discovery that through simple techniques which, while not adding considerable cost to the resultant product, can significantly enhance performance of an elastomeric spring while maintaining the general overall size of the elastomeric spring the same. More specifically, by adding a series of axially spaced members 50 which are embedded wholly within limits of an elastomer body 60 and wherein such members 50 are configured to effectively resist radial outward movement of the elastomeric material while causing the elastomeric material to react in an axial direction between confronting surfaces 54, 56 defined by such members 50 upon axial deflection of the elastomeric spring assembly 40 serves to enhance energy absorption capabilities of the spring assembly 40 without necessarily increasing its overall size.

Certain aspects of the present invention may be best understood by reference to the spring rate behavior of the components used to form spring assembly 40. As schematically represented in FIG. 4, and comparing the energy absorption capability of the same size elastomeric spring, as schematically represented by curve 70, with the energy absorption capability of the elastomeric spring assembly 40, embodying the series of members 50 encapsulated within the elastomeric body 60, as schematically represented by curve 80, the results are unexpected and surprising beneficial for railcar use. As used herein and throughout, the phrase "energy absorption capability" means and refers to the combination of an increased spring rate when the spring is compressed and a decreased spring rate when the force acting on the spring is reduced. In a preferred form, and as schematically illustrated in FIG. 4, the spring assembly 40 has a constantly changing force-deflection curve during operation of the railcar apparatus.

Another important aspect of this invention relates to appreciating the overall enhanced performance or behavior for the elastomeric spring assembly 40 resulting from the cumulative effects of those segments of elastomer extending between and about the axially spaced members 50. That is, the segments of elastomeric material extending between each member 50 embedded within the elastomeric body 60 resists the axial columnar loading applied thereto. Additionally, the segments of elastomeric material extending between each member 50 collectively act in concert with the integrally formed columns of elastomer material extending along the inner and outer sides 66 and 68, respectively, of the spring assembly 40 to inhibit radial bulging of elastomer material from between the coils and provide an unexpected and beneficial result for the performance of spring assembly 40. Another advantage of the elastomeric spring assembly 40 being that cracks which ultimately form in the elastomeric body 60 due to repetitive axial columnar loadings being placed thereon will not tend to propagate as such cracks tend to act with rubber and the like. Moreover, and unlike the series of pads which are frequently used in combination with railcar draft gear assemblies, the present invention is preferably and advantageously configured as an elongated unitary assembly which fits within the spring chamber 24 of the draft gear housing 16.

Still another important aspect of the present invention relates to an ability to control, or "tune" the overall spring performance behavior developed by the elastomeric spring assembly 40 to any particular railcar need, desire and application simply by modifying the components comprising the spring assembly 40. With the present invention, the operative length of the elastomeric body 60, the cross-sectional size of the elastomeric body 60, the thickness of the elastomeric body wall, along with the configuration of the elastomeric body 60 can all be adjusted and engineered to optimize the overall performance of the elastomeric spring assembly 40. Moreover, the number of members 50, the axial distance between adjacent members 50, and configuration of each member 50 are additional factors which add to the ability to control or "tune" performance of the spring assembly 40.

From the foregoing, it will be observed that numerous modifications and variations can be made and effected without departing or detracting from the true spirit and novel concept of the present invention. Moreover, it will be appreciated, the present disclosure is intended to set forth an exemplification of the invention which is not intended to limit the invention to the specific embodiment illustrated. Rather, this disclosure is intended to cover by the appended claims all such modifications and variations as fall within the spirit and scope of the claims.

What is claimed is:

1. An elastomeric spring assembly for a railcar, said spring assembly comprising:
    an elongated body of elastomer which is permanently deformed as a result of precompression of a preform having a precompressed height, said elongated and permanently deformed elastomer body defining an elongated axis and axially spaced ends for said spring assembly; and
    a series of axially spaced members coaxially and centrally arranged and wholly embedded within said permanently deformed elastomer body, with each member being configured to resist radial outward movement of said elastomer body relative to said axis while causing said elastomer to react in an axial direction between confronting surfaces defined by said members upon axial deflection of said elastomeric spring assembly whereby said spring assembly has a repeatable force/deflection curve following precompression of said elastomer body, and with said repeatable force/deflection curve having a substantially increasing rate which persists between initial columnar deflection and about 90% columnar deflection of said spring assembly, and wherein said permanently deformed elastomer body has an outer surface with generally evenly spaced radially bulging permanent ridges formed thereon without any columnar loading being applied to the ends of the elastomer body such that said spring assembly has an operational height of about 80% of the precompressed height of said preform and before being arranged in operable combination with said railcar.

2. The spring assembly according to claim 1 wherein the elastomer forming said elongated body has a plastic to elastic strain ratio greater than 1.5 to 1.

3. The spring assembly according to claim 1 wherein each member is bonded to the elastomer forming said elongated body.

4. The spring assembly according to claim 1 wherein said series of members embedded within said elongated elastomer body comprise helical convolutions of a coil spring.

5. A railcar car apparatus for absorbing, dissipating and returning energy imparted thereto, said apparatus comprising:
    a housing; and
    a spring assembly adapted to be mounted within a cavity defined by said housing, said spring assembly having an elongated body of elastomer which is permanently deformed as a result of precompression of a preform having a precompressed height, with said permanently deformed elastomer body defining an elongated axis and having an inner closed marginal edge, an outer marginal edge, with permanently formed radially bulging and generally evenly spaced permanent ridges formed thereon with no columnar loading being applied to axially spaced first and second ends of said elastomer body, and a series of axially spaced members arranged generally coaxial relative to said elongated and permanently deformed elastomer body, with each member being centralized between the inner closed marginal edge and said outer marginal edge of said permanently deformed elastomer body, and wherein said members resist radial outward movement of the elastomer body while causing elastomer between confronting surfaces of said members to axially react in an axial direction upon axial deflection of said spring assembly whereby providing said spring assembly with a repeatable force/deflection curve following precompression of said preform, and with said repeatable force/deflection curve having a substantially increasing rate which persists between initial columnar deflection and about 90% columnar deflection of said spring assembly, and wherein the radially bulging ridges on said permanently deformed elastomer body provide said spring assembly with an operational height of about 80% of the precompressed height of said preform and before said spring assembly is arranged in operable combination with said railcar apparatus.

6. The railcar apparatus according to claim 5 wherein said elongated elastomer body is formed from an elastomer having a plastic to elastic strain ratio greater than 1.5 to 1.

7. The railcar apparatus according to claim 5 wherein a majority of members embedded within said elongated elastomer body are mechanically bonded to said elastomer body.

8. The railcar apparatus according to claim 5 wherein the inner closed marginal edge of said elongated elastomer body is sized to slidably accommodate while fitting about and along a generally centralized guide provided on said housing.

9. An elastomeric spring assembly for a railroad car apparatus, said elastomeric spring assembly comprising:
    an elongated tubular member of elastomer which is permanently deformed as a result of precompression of a preform having a precompressed height, said tubular and permanently deformed elastomer member having an inner closed marginal edge and an outer marginal edge along with axially spaced first and second ends defining the operational length of said member;
    a coil spring arranged generally coaxial relative to extending substantially the length of said elastomer member and including a series of helical convolutions, with each convolution of said spring being centralized between the inner closed marginal edge and said outer marginal edge of said permanently deformed elastomer member such that the inner radial surface of the majority of said helical convolutions on said coil spring restrict radial outward movements of the elastomer encompassed thereby while confronting axially spaced surfaces on said helical convolutions allow said elastomer to react in an axial direction whereby providing said spring assembly with a repeatable force/deflection curve following precompression of said preform, and with said repeatable force/deflection curve having a substantially increasing rate which persists between initial columnar deflection and about 90% columnar deflection of said spring assembly, and wherein said permanently deformed elastomer member has an outer surface with generally evenly spaced, radially bulging permanent ridges formed thereon without any columnar loading being applied to the ends of the elastomer member such that the operational length of said permanently deformed elastomer member is about 80% of the precompressed height of said preform and before said spring assembly is arranged in operable combination with said railcar apparatus.

10. The elastomeric spring assembly according to claim 9 wherein the elastomer from which said tubular member is formed is mechanically joined to said coil spring.

11. The elastomeric spring assembly according to claim 9 wherein the elastomer from which said tubular member is formed is selected from a class of elastomers having a plastic to elastic strain ratio greater than 1.5 to 1.

12. A method of manufacturing an elastomeric spring assembly defining an elongated axis, said method comprising the steps of:

encapsulating a series of axially spaced members in an elongated body formed from an elastomeric material to create a preform having opposed ends, with each member being generally centralized between inner and outer surfaces on said elongated body, with the majority of said members being configured to resist radial outward movement of said elastomeric material relative to said axis while causing said elastomeric material to react in an axial direction between confronting surfaces defined by said members upon axial deflection of said elongated body, and wherein said preform has a precompressed height between said opposed ends; and compressing said preform by an amount exceeding 15% of the precompressed height of said preform whereby causing permanent deformation of and transmuting said elastomeric body and members into an elastomeric spring assembly having a repeatable force/deflection curve following precompression of said elongated body, and with said repeatable force/deflection curve having a substantially increasing rate which persists between initial columnar deflection and about 90% columnar deflection of said spring assembly, with said permanently deformed elastomeric body of said spring assembly having an outer surface with generally evenly spaced, radially bulging permanent ridges formed thereon without any columnar loading being applied to the opposed ends of the elastomeric body such that said eleastomeric spring assembly has an operational height of about 80% of the precompressed height of said preform and before said spring assembly is arranged in operable combination with said railcar apparatus.

13. The method for making an elastomeric spring assembly according to claim 12 further including the step of: treating an exterior surface of each member to inhibit said elastomeric body encapsulating said members from moving therepast.

14. The method for making an elastomeric spring assembly according to claim 12 further including the step of: providing a central bore in the elastomeric body which opens at opposite ends.

15. The method for making an elastomeric spring assembly according to claim 14 wherein said members embedded within said elongated body are comprised of helical convolutions on a coil spring.

16. The method for making an elastomeric spring assembly according to claim 14 wherein the helical convolutions of said coil spring embedded within said elongated body are radially centralized between the outer and inner diameters of said elongated body.

* * * * *